US009742330B2

United States Patent
Yamada et al.

(10) Patent No.: US 9,742,330 B2
(45) Date of Patent: Aug. 22, 2017

(54) MOTOR CONTROL METHOD AND APPARATUS

(71) Applicant: IAI CORPORATION, Shizuoka (JP)

(72) Inventors: Akihiro Yamada, Shizuoka (JP); Ryoma Hashimoto, Shizuoka (JP)

(73) Assignee: IAI CORPORATION, Shizuoka, Shizuoka (JP)

( * ) Notice: Subject to any disclaimer, the term of this patent is extended or adjusted under 35 U.S.C. 154(b) by 0 days.

(21) Appl. No.: 15/121,337

(22) PCT Filed: Dec. 7, 2015

(86) PCT No.: PCT/JP2015/084308
§ 371 (c)(1),
(2) Date: Aug. 24, 2016

(87) PCT Pub. No.: WO2016/125383
PCT Pub. Date: Aug. 11, 2016

(65) Prior Publication Data
US 2017/0012560 A1 Jan. 12, 2017

(30) Foreign Application Priority Data

Feb. 6, 2015 (JP) .................................. 2015-021854

(51) Int. Cl.
*G05B 19/29* (2006.01)
*H02P 8/14* (2006.01)
(Continued)

(52) U.S. Cl.
CPC .................. *H02P 8/14* (2013.01); *G05B 6/02* (2013.01); *H02P 6/16* (2013.01); *H02P 8/24* (2013.01); *H02P 27/08* (2013.01)

(58) Field of Classification Search
CPC ......... G05B 19/416; H02P 27/08; H02P 6/16; H02P 8/14
(Continued)

(56) References Cited

U.S. PATENT DOCUMENTS 4,350,941 A * 9/1982 McClure .............. G05B 19/232
318/603
5,940,105 A 8/1999 Hayami
(Continued)

FOREIGN PATENT DOCUMENTS

JP S61-235911 A 10/1986
JP H09-204225 A 8/1997
(Continued)

OTHER PUBLICATIONS

English, translation of PCT/ISA/237 (written opinion of the International Searching Authority, dated Mar. 8, 2016) in PCT/JP2015/084308 with the translator's declaration.
(Continued)

*Primary Examiner* — Bentsu Ro
*Assistant Examiner* — Thai Dinh
(74) *Attorney, Agent, or Firm* — McGinn IP Law Group, PLLC

(57) ABSTRACT

A motor control apparatus includes a high-resolution encoder for position control and a low-resolution encoder for velocity control, position control means for generating a velocity command in accordance with a difference between a given position command and the output of the high-resolution encoder, and velocity control means for generating a current command in accordance with a difference between the velocity command and a detected velocity that is based upon the output of the low-resolution encoder. A velocity control cycle based upon the velocity control means is made faster than a position control cycle based upon the position control means.

20 Claims, 1 Drawing Sheet

(51) Int. Cl.
*H02P 8/24* (2006.01)
*G05B 6/02* (2006.01)
*H02P 6/16* (2016.01)
*H02P 27/08* (2006.01)

(58) Field of Classification Search
USPC ....... 318/603, 560, 565, 600, 607, 615, 616, 318/617, 632
See application file for complete search history.

(56) References Cited

U.S. PATENT DOCUMENTS

| | | | |
|---|---|---|---|
| 6,194,856 B1 | 2/2001 | Kobayashi et al. | |
| 6,590,358 B1 * | 7/2003 | Tsutsui | G05B 5/01 318/560 |
| 7,026,779 B2 * | 4/2006 | Eba | G05B 19/19 318/560 |
| 7,638,965 B2 * | 12/2009 | Miyazaki | B60L 15/36 318/560 |
| 9,503,005 B2 * | 11/2016 | Ueyama | H02P 8/14 |
| 2005/0067996 A1 | 3/2005 | Eba | |

FOREIGN PATENT DOCUMENTS

| | | |
|---|---|---|
| JP | 2000-217367 A | 8/2000 |
| JP | 2004-320847 A | 11/2004 |
| JP | 2005-110344 A | 4/2005 |

OTHER PUBLICATIONS

International Search Report (ISR) (PCT Form PCT/ISA/210), in PCT/JP2015/084308, dated Mar. 8, 2016.
PCT/ISA/237 (written opinion of the International Searching Authority, dated Aug. 11, 2016) in PCT/JP2015/084308.

* cited by examiner

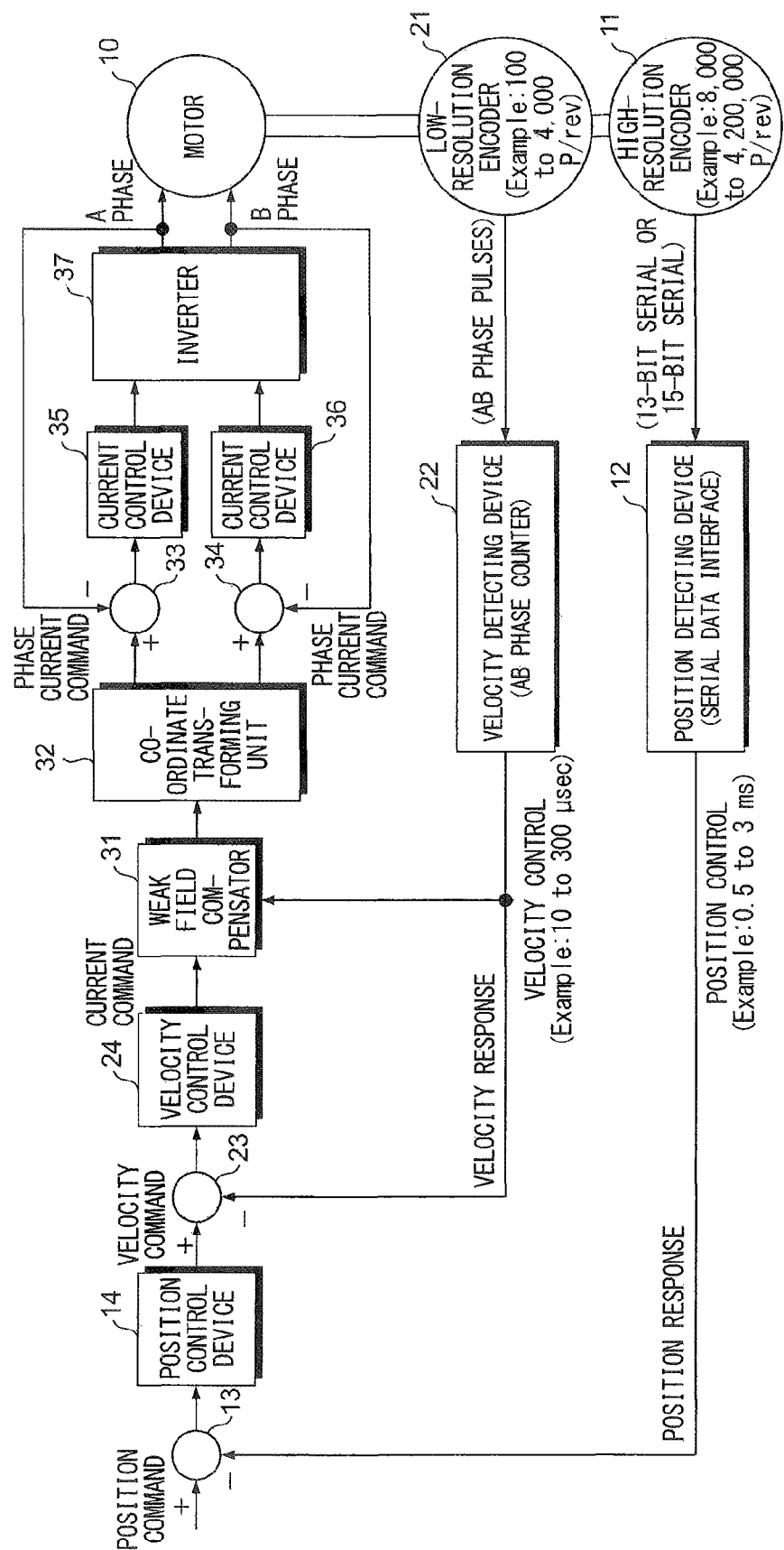

MOTOR CONTROL METHOD AND APPARATUS

TECHNICAL FIELD

This invention relates to a motor control method and apparatus and, more particularly, to a motor control method and apparatus in which highly precise positioning is possible in a case where the motor is used as a driving source for an actuator and the like.

BACKGROUND ART

In order to perform fine control of motion of an actuator or the like, high-resolution positioning precision is required. In order to carry out high-resolution control of position, it is necessary to equip feedback control with a high-resolution encoder which detects the rotational angular position of a motor. There are many high-resolution encoders that transmit data by serial communication. Owing to serial communication (serial data), a problem which arises is that communication takes time (tens of microseconds, for example).

Patent Document 1 describes a feedback control method and apparatus for a stepping motor serving as an example of motor control. In the control apparatus, the output of a single encoder is used as a feedback signal for controlling the position and velocity of a stepping motor. In a case where use is made of an encoder that transmits data at a high resolution by means of serial communication, even though tens of microseconds are required on account of serial communication, in control of position no particularly significant problem arises because it will suffice if feedback control is carried out at a control cycle on the order of milliseconds.

PATENT DOCUMENTS

[Patent Document 1]: Japanese Patent Application Laid-Open No. 2004-320847

With regard to velocity control, however, the fact that a stepping motor has many pole pairs (50 pole pairs, for example) so that the electrical lead (advance) angle per unit time is large means that such control cannot be accommodated unless the control cycle is speeded up (on the order of tens of microseconds, for example). Accordingly, a high-resolution encoder in which serial communication takes tens of microseconds cannot be used. That is, in a case where a high-resolution encoder is used in order to achieve highly precise position control, a problem is that both feedback position control and feedback velocity control are not compatible.

SUMMARY OF THE INVENTION

An object of the present invention is to achieve both position control and velocity control in feedback control of a motor in which highly precise positioning is possible.

In relation to a motor control apparatus, the present invention provides a motor control apparatus for performing feedback control inclusive of position control and velocity control, characterized by having: a high-resolution encoder for detecting rotational position of a motor in order to carry out position control; and a low-resolution encoder for detecting rotational velocity of the motor in order to carry out velocity control; a velocity control cycle being made faster than a position control cycle.

Further, in relation to a control method, the present invention provides a motor control method for performing feedback control inclusive of position control and velocity control, characterized by: providing a high-resolution encoder for detecting rotational position of a motor in order to carry out position control and a low-resolution encoder for detecting rotational velocity of the motor in order to carry out velocity control; and making a velocity control cycle faster than a position control cycle.

In a more concrete embodiment of a motor control apparatus, the present invention provides a motor control apparatus for performing feedback control inclusive of position control and velocity control, characterized by having: a high-resolution encoder for detecting rotational position of a motor in order to carry out position control; a low-resolution encoder for detecting rotational velocity of the motor in order to carry out velocity control; position control means for generating a velocity command in accordance with a difference between a given position command and a detected position that is based upon an output from the high-resolution encoder; and velocity control means for generating a driving output command (current command or voltage command) in accordance with a difference between the velocity command and a detected velocity that is based upon an output from the low-resolution encoder; a velocity control cycle based upon the velocity control means being made faster than a position control cycle based upon the position control means.

In a more concrete embodiment of a motor control method, the present invention provides a motor control method for performing feedback control inclusive of position control and velocity control, characterized by: providing a high-resolution encoder for detecting rotational position of a motor in order to carry out position control and a low-resolution encoder for detecting rotational velocity of the motor in order to carry out velocity control; generating a velocity command in accordance with a difference between a given position command and a detected position that is based upon an output from the high-resolution encoder; generating a driving output command (current command or voltage command) in accordance with a difference between the velocity command and a detected velocity that is based upon an output from the low-resolution encoder; and making a cycle of velocity control for generating the driving output command faster than a cycle of position control for generating the velocity command.

In the description rendered above, high resolution and low resolution are relative terms. More specifically, as a guide, the high-resolution encoder is one that generates approximately 8,000 to 4,200,000 pulses per revolution of the motor, and the low-resolution encoder is one that generates approximately 100 to 4,000 pulses per revolution of the motor.

In the description rendered above, the position control cycle and velocity control cycle are also relative terms with regard to the size relationship between them. More specifically, as a guide, the position control cycle is approximately 0.5 to 3 milliseconds, and the velocity control cycle is approximately 10 to 300 microseconds.

In accordance with the present invention, a low-resolution encoder is used in relation to velocity control that requires feedback at a high-speed control cycle, and a high-resolution encoder is used with regard to position control (position response) in which feedback is possible at a low-speed control cycle. Even if serial data is output from the high-resolution encoder and communication takes time, a low-speed control cycle is acceptable in position control and therefore position control of the motor can be performed at a higher resolution. Since the low-resolution encoder generates pulses having a frequency that conforms to the angle of rotation (this encoder does not output serial data), it is possible to speed up the control cycle.

Thus, according to the present invention, highly precise position control and high-speed velocity control can both be achieved.

BRIEF DESCRIPTION OF THE DRAWINGS

FIG. 1 is a functional block diagram illustrating a detection system, control system and drive system of a stepping motor illustrating an embodiment of the present invention.

EMBODIMENT FOR CARRYING OUT THE INVENTION

This embodiment is one in which the present invention is applied to a stepping motor.

FIG. 1 is a functional block diagram illustrating a detection system, control system and drive system inclusive of a driving circuit and control circuit (control unit) of a stepping motor. All or part of the control circuit shown in the Figure, such as, for example, a subtractor 13, position control device 14, subtractor 23, velocity control device 24, weak field compensator 31 and coordinate transforming unit 32, can be implemented not only by individual hardware circuits but also by a computer (processor) and software installed in the computer. Furthermore, all or part of a portion of the detection system and drive system, e.g., a position detecting device 12, velocity detecting device 22, subtractors 33, 34 and current control devices 35, 36, can be implemented by individual hardware circuits or by a computer and software installed in the computer.

A two-phase stepping motor 10 is driven by driving current (motor current) of an A phase (and a phase that is the inverse of the A phase) and a B phase (a phase that is the inverse of the B phase). The stepping motor 10 is provided with two types of encoder, namely a high-resolution encoder 11 for position control and a low-resolution encoder 21 for velocity control. These detect amount of rotation (rotational angle position, number of revolutions, rotational velocity, etc.) of the stepping motor 10.

It is preferred that the high-resolution encoder 11 output a signal having a resolution on the order of 8,000 to 4,200,000 P/rev (pulses/revolution). One example is a 13-bit (8,192 counts/revolution) or 15-bit (32,768 counts/revolution) absolute encoder. It is preferred that the low-resolution encoder 21 output a signal having a resolution on the order of 100 to 4,000 P/rev (pulses/revolution). One example is a 200 pulses/revolution incremental encoder.

The output signal of the high-resolution encoder 11 is applied via the position detecting device 12 to the subtractor 13 as a signal (position response) representing detected position (rotational angle position). The position detecting device 12 is a serial interface that accepts a 13- or 15-bit serial signal, for example, that is output from the high-resolution encoder 11, and converts the signal to parallel data. In accordance with a program (such as, for example, one for circular motion or linear motion) as to how to control drive of the motor 10 itself or motion of an actuator driven by the motor 10, a position command intended for the stepping motor 10 is created by a host computer (not shown) and is applied to the subtractor 13. The subtractor 13 finds the difference between a given position command and the detected position and applies the difference to the position control device 14. The position control device 14 creates a velocity command, which is intended for the stepping motor 10, based upon the input difference signal.

The output signal (A-, B-phase pulse signal, for example) that is output from the low-resolution encoder 21 is applied to the velocity detecting device 22. For example, the velocity detecting device 22 includes a counter, counts the A-, B-phase pulses and outputs a detected-velocity signal (velocity response). (Since the encoder 21 is a low-resolution encoder and velocity control is performed a high speed, the velocity detecting device 22 performs a smoothing operation as by a method that obtains a moving average, for example, and generates a signal representing velocity.) The subtractor 23 obtains the difference between the velocity command that is output from the position control device 14 and the detected velocity that is output from the velocity detecting device 22 and applies the difference to the velocity control device 24. The velocity control device 24 generates and outputs a current command (or a voltage command depending upon the type of motor) based upon the difference in velocity applied thereto.

The current command is applied to the weak field (field weakening) compensator 31. The velocity signal from the velocity detecting device 22 also is input to the weak field compensator 31. The weak field compensator 31 is described in detail in Patent Document 1 cited above. When the stepping motor rotates faster, a back (counter) emf (electromotive force) ascribable to the magnetic flux of the rotor magnet increases. Weak field compensation (field weakening) refers to suppressing the generation of back emf by passing a current through the stator coil so as to generate a magnetic flux in a direction opposite that of the flux of the rotor magnet (passing a current not only along the q axis of the rotational coordinate system that produces torque but also along the d axis), thereby canceling out magnetic flux. Weak field compensation is carried out when the product of the current command value and rotational velocity (detected velocity) exceeds a predetermined threshold value.

[The input current command (current command value along the q axis) is output as is when weak field compensation is not carried out.]

The coordinate transforming unit 32 converts current values (Iq, Id) along the q and d axes of the rotational coordinate system, which values are output from the weak field compensator 31 (Id=0 when weak field compensation is not carried out), to phase currents $I_A$, $I_B$ of a fixed (static) coordinate system and outputs these as phase current commands. The currents of the A and B phases that flow into the motor 10 are detected by a current detecting device (not shown), the differences between the phase current commands and the detected phase currents are calculated by the subtractors 33 and 34, respectively, and the differences are applied to the current control devices 35, 36. Based upon the difference signals input thereto, the current control devices 35, 36 generate signals for controlling an inverter [a PWM (Pulse-Width Modulation) inverter 37, for example], thereby controlling the inverter 37. The stepping motor 10 is driven by the inverter 37.

In the description rendered above, position control (feedback control) is carried out mainly by the high-resolution encoder 11, the position detecting device 12, subtractor 13 and position control device 14 (inclusive of the host computer that generates the position command). The high-resolution encoder 11 is used as a position control encoder in order to deal with the need for highly precise positioning. In this case, the control cycle of position control need not necessarily be speeded up (because motion of the actuator driven by the motor is slow) and may be on the order of milliseconds (0.5 to 3 ms). One example of the position control cycle is 1 ms. Accordingly, no problems result even if serial communication of the output signal from the high-resolution encoder 11 takes tens of microseconds. An encoder that outputs serial data can be used as the high-resolution encoder.

Velocity control (feedback control) is carried out mainly by the low-resolution encoder 21, velocity detecting device 22, subtractor 23 and velocity control device 24. Since there are many pole pairs (50 pole pairs, for example) in the case of a stepping motor, the control cycle must be speeded up (on the order of tens of microseconds, e.g., 10 to 300 microseconds). One example is 50 microseconds. Since the low-resolution encoder 21 is used, the velocity control cycle can be speeded up. That is, since the low-resolution encoder outputs pulse signals having a frequency proportional to (conforming to) the amount of rotation of the motor, as in the manner of the pulse signals of the A and B phases (the encoder does not output serial data) (performing serial communication is not necessary), the time needed for transmission of the signals is very short. As a result, speeding up of the control cycle can be achieved.

Thus, in relation to velocity control (velocity response) that requires feedback at a high-speed control cycle, use is made of a low-resolution encoder. With regard to position control (position response) in which feedback is possible at a low-speed control cycle, use is made of a high-resolution encoder. Even if serial data is output from the high-resolution encoder and communication takes time, a low-speed control cycle is acceptable in position control and therefore position control of the stepping motor can be performed at a higher resolution.

The foregoing embodiment relates to feedback control of a stepping motor and the present invention is particularly effective in control of a stepping motor. However, it goes without saying that the present invention is applicable also to other types of motor, e.g., an AC servomotor.

DESCRIPTION OF SYMBOLS

10 . . . stepping motor
11 . . . high-resolution encoder
12 . . . position detecting device
13, 23 . . . subtractor
14 . . . position control device
21 . . . low-resolution encoder
22 . . . velocity detecting device
24 . . . velocity control device

The invention claimed is:

1. A motor control apparatus for performing feedback control inclusive of position control and velocity control, comprising:
  a high-resolution encoder for detecting rotational position of a motor in order to carry out position control; and
  a low-resolution encoder for detecting rotational velocity of the motor in order to carry out velocity control;
  a velocity control cycle being made faster than a position control cycle.

2. A motor control apparatus according to claim 1, wherein said high-resolution encoder outputs serial data representing rotational position of the motor.

3. A motor control apparatus according to claim 2, wherein said high-resolution encoder generates 8,000 to 4,200,000 pulses per revolution of the motor.

4. A motor control apparatus according to claim 1, wherein said high-resolution encoder generates 8,000 to 4,200,000 pulses per revolution of the motor.

5. A motor control apparatus according to claim 1, wherein said low-resolution encoder outputs pulses having a frequency conforming to amount of rotation of the motor.

6. A motor control apparatus according to claim 5, wherein said low-resolution encoder generates 100 to 4,000 pulses per revolution of the motor.

7. A motor control apparatus according to claim 1, wherein said low-resolution encoder generates 100 to 4,000 pulses per revolution of the motor.

8. A motor control apparatus according to claim 1, wherein the position control cycle is 0.5 to 3 milliseconds.

9. A motor control apparatus according to claim 1, wherein the velocity control cycle is 10 to 300 microseconds.

10. A motor control apparatus for performing feedback control inclusive of position control and velocity control, comprising:
  a high-resolution encoder for detecting rotational position of a motor in order to carry out position control;
  a low-resolution encoder for detecting rotational velocity of the motor in order to carry out velocity control;
  position control means for generating a velocity command in accordance with a difference between a given position command and a detected position that is based upon an output from said high-resolution encoder; and
  velocity control means for generating a driving output command in accordance with a difference between the velocity command and a detected velocity that is based upon an output from said low-resolution encoder;
  a velocity control cycle based upon said velocity control means being made faster than a position control cycle based upon said position control means.

11. A motor control apparatus according to claim 10, wherein the driving output command is a current command.

12. A motor control apparatus according to claim 10, wherein the driving output command is a voltage command.

13. A motor control apparatus according to claim 10, wherein said high-resolution encoder outputs serial data representing rotational position of the motor.

14. A motor control apparatus according to claim 10, wherein said high-resolution encoder generates 8,000 to 4,200,000 pulses per revolution of the motor.

15. A motor control apparatus according to claim 10, wherein said low-resolution encoder outputs pulses having a frequency conforming to amount of rotation of the motor.

16. A motor control apparatus according to claim 10, wherein said low-resolution encoder generates 100 to 4,000 pulses per revolution of the motor.

17. A motor control apparatus according to claim 10, wherein the position control cycle is 0.5 to 3 milliseconds.

18. A motor control apparatus according to claim 10, wherein the velocity control cycle is 10 to 300 microseconds.

19. A motor control method for performing feedback control inclusive of position control and velocity control, comprising:
  providing a high-resolution encoder for detecting rotational position of a motor in order to carry out position control and a low-resolution encoder for detecting rotational velocity of the motor in order to carry out velocity control; and making a velocity control cycle faster than a position control cycle.

20. A motor control method for performing feedback control inclusive of position control and velocity control, comprising:
- providing a high-resolution encoder for detecting rotational position of a motor in order to carry out position control and a low-resolution encoder for detecting rotational velocity of the motor in order to carry out velocity control;
- generating a velocity command in accordance with a difference between a given position command and a detected position that is based upon an output from said high-resolution encoder;
- generating a driving output command in accordance with a difference between the velocity command and a detected velocity that is based upon an output from said low-resolution encoder; and
- making a cycle of velocity control for generating the driving output command faster than a cycle of position control for generating the velocity command.

* * * * *